US007654814B2

(12) United States Patent
Schikowski et al.

(10) Patent No.: US 7,654,814 B2
(45) Date of Patent: Feb. 2, 2010

(54) ROTARY PRESS

(75) Inventors: Jürgen Schikowski, Schwarzenbek (DE); Ingo Schmidt, Schwarzenbek (DE); Thorsten Ehrich, Hamburg (DE); Helmut Bommrowitz, Mölln (DE)

(73) Assignee: Fette GmbH, Schwarzenbek (DE)

( * ) Notice: Subject to any disclaimer, the term of this patent is extended or adjusted under 35 U.S.C. 154(b) by 183 days.

(21) Appl. No.: 11/254,228

(22) Filed: Oct. 19, 2005

(65) Prior Publication Data

US 2006/0083804 A1 Apr. 20, 2006

(30) Foreign Application Priority Data

Oct. 20, 2004 (DE) ...................... 10 2004 051 006

(51) Int. Cl.
*B29C 43/08* (2006.01)
*B29C 43/52* (2006.01)

(52) U.S. Cl. ...................... 425/225; 425/231; 425/345; 425/407

(58) Field of Classification Search .................. 425/78, 425/344–345, 210, 225, 231, 107, 353, 407, 425/348 R See application file for complete search history.

(56) References Cited

U.S. PATENT DOCUMENTS

| | | | | |
|---|---|---|---|---|
| 3,677,673 | A * | 7/1972 | Shapiro | 425/78 |
| 4,061,453 | A * | 12/1977 | DeSantis | 425/78 |
| 4,219,320 | A * | 8/1980 | Stuben et al. | 425/345 |
| 5,449,481 | A * | 9/1995 | Sagawa et al. | 425/352 |
| 5,536,331 | A * | 7/1996 | Korsch | 134/21 |
| 5,643,630 | A * | 7/1997 | Hinzpeter et al. | 427/133 |
| 6,749,416 | B2 * | 6/2004 | Arndt et al. | 425/352 |
| 6,750,193 | B1 * | 6/2004 | Holderbaum et al. | 510/446 |
| 6,866,493 | B2 * | 3/2005 | Trebbi et al. | 425/345 |

FOREIGN PATENT DOCUMENTS

| | | |
|---|---|---|
| DE | 2 042 224 | 3/1972 |
| DE | 29 43 789 | 5/1980 |
| DE | 88 16 064.5 | 2/1989 |
| DE | 100 46 869 | 4/2002 |
| DE | 100 24 340 | 9/2002 |
| DE | 101 42 624 | 4/2003 |
| EP | 0 448 190 | 9/1991 |
| EP | 1 070 497 | 1/2001 |
| WO | 00/27618 | 5/2000 |

OTHER PUBLICATIONS

PAJ:Patent Abstracts of Japan CD ROM 1989 JP01321100A.

* cited by examiner

*Primary Examiner*—Yogendra Gupta
*Assistant Examiner*—Thu Khanh T Nguyen
(74) *Attorney, Agent, or Firm*—Vidas, Arrett & Steinkraus, P.A.

(57) ABSTRACT

Rotary press comprising a rotor rotatably driven about a vertical axis, said rotor exhibiting a die plate and upper and lower punches which are vertically guided in guides of the rotor working together with die holes in a die plate, at least one press station which exhibits an upper and a lower pressure passed by the punches and through which the punches are moved towards the die hole in order to compress the material in the die hole, characterized in that the rotor is provided with means which act upon compacts or parts thereof which adhere to the pressing surface or which means eliminate or prevent an adherence of a compact or parts thereof to the pressing surface of the upper punch, respectively, during the return stroke.

14 Claims, 1 Drawing Sheet

ROTARY PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

It is known to use rotary presses for making tablets and similar compacts. These presses exhibit a rotor which is beared and driven rotatably about a vertical axis, wherein the rotor exhibits a die plate and punch guides for upper and lower punches. These upper and lower punches are controlled by appropriate cams, and in at least one press station an upper and a lower pressure roller are disposed, with the help of which the punches compress the material to be compressed which is present in the dies.

After the pressing process, some materials to be compressed tend to adhere to the pressing surface of the upper punches, when the upper punch starts its return stroke. This effect causes the surface of the compact not to have the desired quality and moreover has an adverse effect on the subsequent pressing process. From EP 0 448 190 B1 and DE 88 16 064 U1, it has become known to bear the punches rotatably in the punch guides and to set them in a rotationary motion during the return stroke after a pressing process. By means of the rotation of the punches, the adherence effect can be eliminated to a large extent. From DE 100 24 340 C2 it is also known to bear a punch insert rotatably in the punch shaft, wherein the insert exhibits a projection which is guided in a helical curve-fashion between two axially spaced guides. A spring biases the insert downwards away from the punch shaft.

During the return stroke of the upper punches, an unloading occurs, while the upper punches are usually located within the dies. If the compact is noncircular, for example quadratic, a rotation of the punches or the inserts, respectively, is not suitable.

The invention is based on the problem to create a rotary press in which an adherence of the compact or of material of the compact is not possible also for a noncircular cross-sectional shape of the dies.

BRIEF SUMMARY OF THE INVENTION

According to the invention, the rotor is provided with means which act upon compacts or parts of compacts which adhere to the pressing surface of the upper punches, in order to prevent a continuous adherence to the pressing punches. Rotatability of the upper punch is an especially effective means, when the punch is lying in its bottom dead center position with its pressing surface approximately on a level with the facing surface of the die plate or with the upper surface of the die, respectively. Here, the upper punch does not extend into the die during the pressing process, as is the case in common rotary presses, instead the lowest point of the pressing surface is the top edge of the die. Preferably, the diameter of the pressing surface is larger than the diameter of the die hole. Thus, the die is completely covered, and the pressing process is accomplished mainly by means of the lower punch, while the upper punch merely provides the back pressure.

The rotary motion of the punch can be accomplished in the same way as has been described already in DE 100 24 340 C2, for example.

According to an aspect of the invention, the pressing surface is approximately equal to the outer diameter of the die. This ensures that, for a certain height-offset between the top edge of the die plate and the upper surface of the die, the upper punch does not touch the top edge of the die plate. The outer edge of the upper punch can be noncircular or polygonal, and the cross-section of the die hole is formed accordingly. The upper punch shall be dimensioned such that the die hole is covered entirely.

According to a further preferred aspect of the invention, the pressing surface of the upper punch is formed on inserts at the shaft of the punch, wherein the inserts are made of a dimensionally stable, lightly adhering plastic. The plastic is for example PEEK, which has a sufficient stability, and which on the other hand prevents the material to be compressed from sticking to it. As is generally known, one distinguishes between a so-called sugar-sticking and a fat-sticking. Fat-sticking is especially critical, occuring for example when pressing bouillon cubes or the like. Preferably, the plastic inserts are exchangeable, so that in the event of damage, only them need to be exchanged and not the entire punch. For this reason, it is purposeful not to attach the inserts to the punches by an adhesive, but to mount them in an other fashion.

In addition or alternatively, the rotor can be provided with an impacting mechanism which gives one or several impacts on the upper punch during the return stroke of the punch. Thereby, a compact that adheres to the pressing surface is getting loosened. Where appropriate, a loosening of an adhering part of a compact occurs as well.

An other alternative option for loosening of an adhering compact or parts thereof is, according to an aspect of the invention, to provide a device for heating or cooling of the upper punches. A cooling makes sure that an adherence is prevented from the outset. A heating can primarily give rise to a loosening of adhering material. Heating or cooling can for example take place by means of a gas, for example cold nitrogen.

Alternatively, the rotor itself can be provided with a device for cooling of the material to be compressed.

Because it cannot always be avoided that residues adhere to the pressing surface of the upper punches, another aspect of the invention envisions to provide a cleaning device for cleaning the pressing surfaces of the upper punches after the pressing process. The cleaning device can exhibit for example wiper means, with which the pressing surface of the upper punches is cleaned. In addition or alternatively, an ultrasound cleaning device can be provided.

In the following, the invention is further exemplified on the basis of an embodiment illustrated in a drawing.

DETAILED DESCRIPTION OF THE INVENTION

Figure 1:
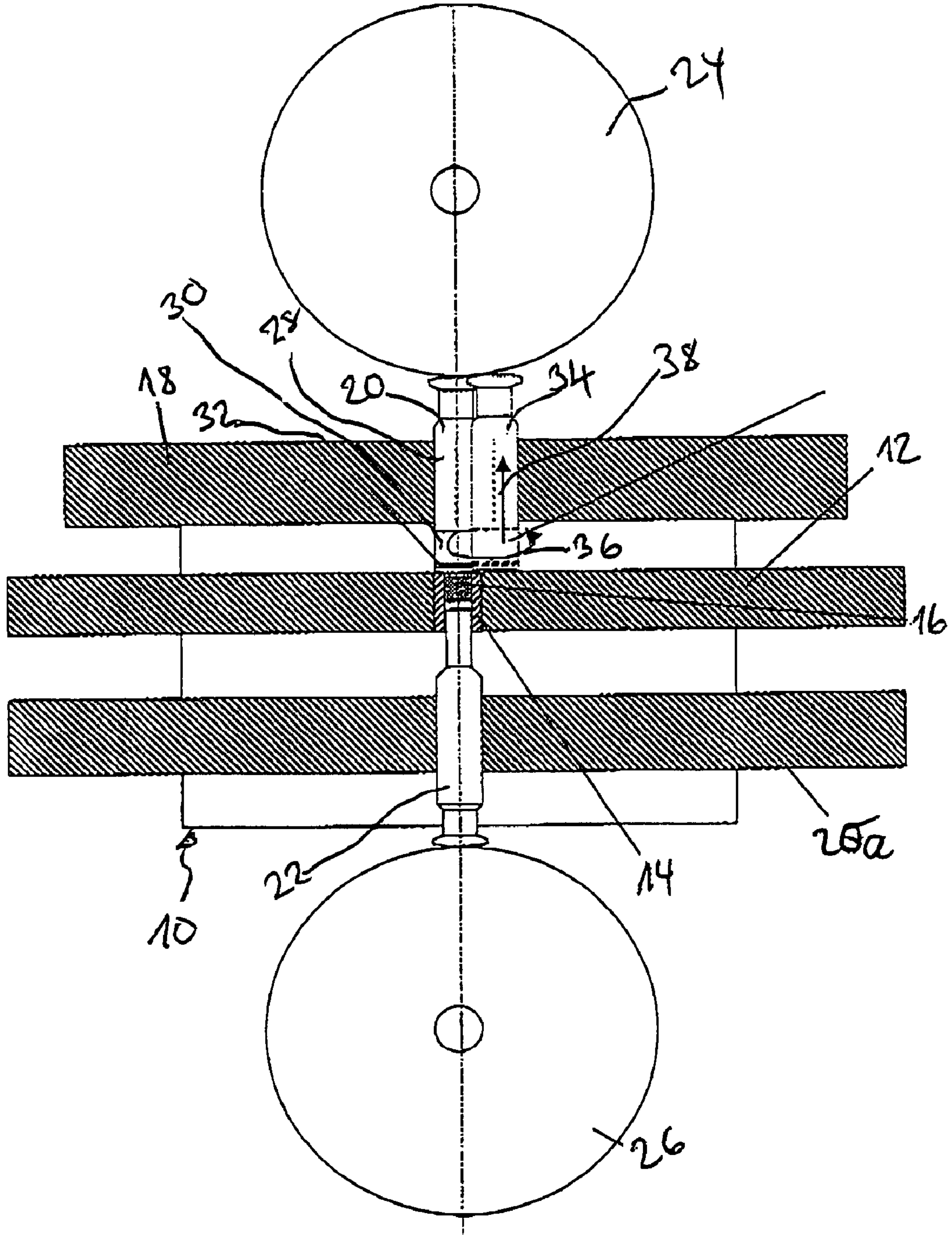
FIG. 1 shows a cross section through a rotor with an upper and a lower punch in a press station.

While this invention may be embodied in many different forms, there are described in detail herein a specific preferred embodiment of the invention. This description is an exemplification of the principles of the invention and is not intended to limit the invention to the particular embodiment illustrated A rotor 10 of a rotary press is rotatably beared about a vertical axis by means of a drive mechanism which is not shown. The bearing and other parts of the rotary press are not shown because they are generally known. The rotor 10 exhibits a die plate 12, which is provided with a series of dies 14 in a given partition, which dies are embedded in corresponding holes of the die plate 12. The dies 14 serve to take up material to be compressed, as is shown at 16. In the given example, the cross section of the die holes shall be square, for example in order to compress material for bouillon cubes.

In upper and lower guides 18, 20*a* of rotor 10, the upper and lower punches are disposed in a vertically relocatable manner. In the drawing, an upper punch 20 and a lower punch 22 are shown for illustrative purposes. It shall be understood that, corresponding to the number of dies 14, a corresponding number of upper and lower punches is provided with a corresponding partition. As can be seen, the lower punch 22 extends with its pressing surface into the hole of the die 14 by a predetermined amount.

By means of guides which are not shown, the upper and lower punches are guided in their position relative to the die plate 12. If a pair of punches 20, 22 approaches a press station, in which an upper pressure roller 24 and a lower pressure roller 26 are disposed, the punches with their respective pressing surfaces are guided in a predetermined way. In doing so, the lower punch 22 is located already within the die 14, while the upper punch 20 is located outside of the die, namely during the filling and also afterwards, wherein the upper punch 20 is adjusted gradually towards the die plate 12. Beneath or above the pressure rollers 24, 26, respectively, the punches 20, 22 are adjusted by a predetermined distance in order to accomplish a pressing process.

In the embodiment according to the drawing, the upper punch 20 is formed in three parts, namely with a shaft 28, which exhibits an engagement surface for the pressure roller 24 at its upper ending, an insert 30, which is formed at the shaft 20 in an exchangeable manner, and a plastic section 32 at the insert 30, which for example is attached to the insert 30 by an adhesive. However, one could also think of a connection between the parts by means of screws. As can be seen, the diameter of the plastic section 32 or its edge length, respectively, corresponds to the edge length of the die bushing, which has a square or quadratic cross section. The die bushing is dimensioned such that it is flush with the facing side of the die plate 12. As can be seen from the figur, the plastic section 32, which is preferably planar, contacts the die 14 when the upper punch 20 reaches its maximal lowermost position. The plastic section 32 is formed of a dimensionally stable, preferably anti-adheringly acting plastic material.

During the return stroke of the upper punch 20, which begins immediately after leaving the lowermost point of the pressure roller 24, the rotatably beared upper punch is set in rotation. This is indicated at 34 in dashed lines. The rotation is indicated by the arrow 36 and the return stroke by the arrow 38. It shall be understood that in the actual embodiment the die 14 is also aligned vertically with respect to the upper punch 34, when the return stroke begins. The described rotation of the upper punch 34 can be accomplished in any known manner. For example, the rotation can be carried out as is described in EP 0 448 190 B1 or, which is applied preferably, in the manner disclosed in DE 100 24 340 C2. Here, complex provisions in the rotary press are omitted, because the rotation mechanism is implemented within the punches.

The rotation of the upper punches 20 effects that material possibly adhering to the pressing surface is loosened and that the return stroke does not lead to a compact or parts thereof adhering to the pressing surface.

Conceivably, in order to improve the anti-adhering effect, the pressing surface of the upper punch 20 may be coated with an anti-adhering coating, for example cold-dissolvable starch may be sprayed on. Alternatively or in addition, it is conceivable to heat or cool the upper punches 20, for example by means of hot or cold gas directed to the punches or the pressing surface. Of course, it is also conceivable to cool down the material 16 to be compressed beforehand to a certain extent in order to reduce the adhering effect, without suffering the material's ability to be compressed. Finally, it is also conceivable to clean the pressing surface after the pressing process, for example by means of a wiper, or by means of ultrasound. All of the last-mentioned provisions, which can be employed alternatively or in addition to the rotation of the punch, are, however, not shown.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A rotary press comprising:

an upper punch, a lower punch, and a die plate, wherein:

the die plate comprises an upper surface and a die bore, the rim of the die bore is defined by the upper surface, the upper punch comprises a pressing surface positioned facing the die plate, the pressing surface has a dead center, the pressing surface is sized to completely cover the die bore when the dead center is co-planar to the upper surface of the die plate, the pressing surface is constructed and arranged to reversibly move along a vertical axis closer to and farther away from the die plate, and the upper punch is constructed and arranged to rotate about said vertical axis only when moved along the vertical axis farther away from the die plate, and further wherein the cross-sectional surface of the die bore is noncircular or polygonal.

2. The rotary press according to claim 1, further comprising an upper pressure roller positioned above and in contact with the upper punch, the die plate having a facing surface and an upper surface, the upper pressure roller is constructed and arranged to position the dead center of the pressing surface of the upper punch level with the facing surface of the die plate or the upper surface of the die plate, respectively.

3. Rotary press according to claim 1, characterized in that the pressing surface of the upper punch is approximately equal to the outer diameter of the die bore.

4. Rotary press according to claim 1, characterized in that the pressing surface of at least the upper punches comprises an insert, the insert comprising a dimensionally stable, lightly adhering plastic section.

5. Rotary press according to claim 4, characterized in that the inserts or the plastic sections, respectively, are exchangeable.

6. Rotary press according to claim 1, characterized in that the rotary press further comprises a spraying device which sprays an anti-adhering means on the pressing surface of the upper punches.

7. Rotary press according to claim 1, characterized in that the rotary press further comprises an impacting mechanism which gives one or more impacts on the upper punches during the return stroke of the punches.

8. Device according to claim 1, characterized in that the rotary press comprises a heating or cooling device for the upper punches.

9. Rotary press according to claim 8, characterized in that the device directs hot or cold gas to the pressing surface of the upper punches.

10. Rotary press according to claim 1, characterized in that the rotary press comprises a device for cooling of the material to be compressed before the material is filled into the die bores or within the die bores.

11. Rotary press according to claim 1, characterized in that the rotary press further comprises a cleaning device for cleaning of the pressing surface of the upper punches after the pressing process.

12. Rotary press according to claim 11, the cleaning device being a wiper means, the wiper means cleaning the pressing surfaces of the upper punches.

13. Rotary press according to claim 11, the cleaning device being an ultrasound cleaning device.

14. A rotary press comprising a rotor supported for rotation about a vertical axis, a die plate, and upper and lower punches which are vertically guided by guide means of the rotor and which are adapted to cooperate with die bores in the die plate, at least one pressing station which has an upper and a lower pressure roller passed by the upper and lower punches to be moved towards the die bores in order to press the material within the die bores, a guide means being provided upstream of the pressure station, and an upper pressure roller positioned above the upper punch, the rotor is associated with a rotation means constructed and arranged to rotate the upper punches about their longitudinal axes, the upper punches have a pressing surface which is larger than the cross-sectional surface of the die bores and completely covers the die bores, the rotation means in order to rotate the upper punches designed such that a rotation is only caused during the return stroke of the upper punches, the upper pressure roller is constructed and arranged to position the dead center of a pressing surface of the upper punches at a level of an associated surface of the die plate or an upper surface of the die, and further wherein the cross-sectional surface of the die bores is noncircular or polygonal.

* * * * *